July 7, 1964
C. M. WYMAN ETAL
3,140,034
EXPANSIBLE COVER FOR A POPCORN PACKAGE
Filed Oct. 13, 1961
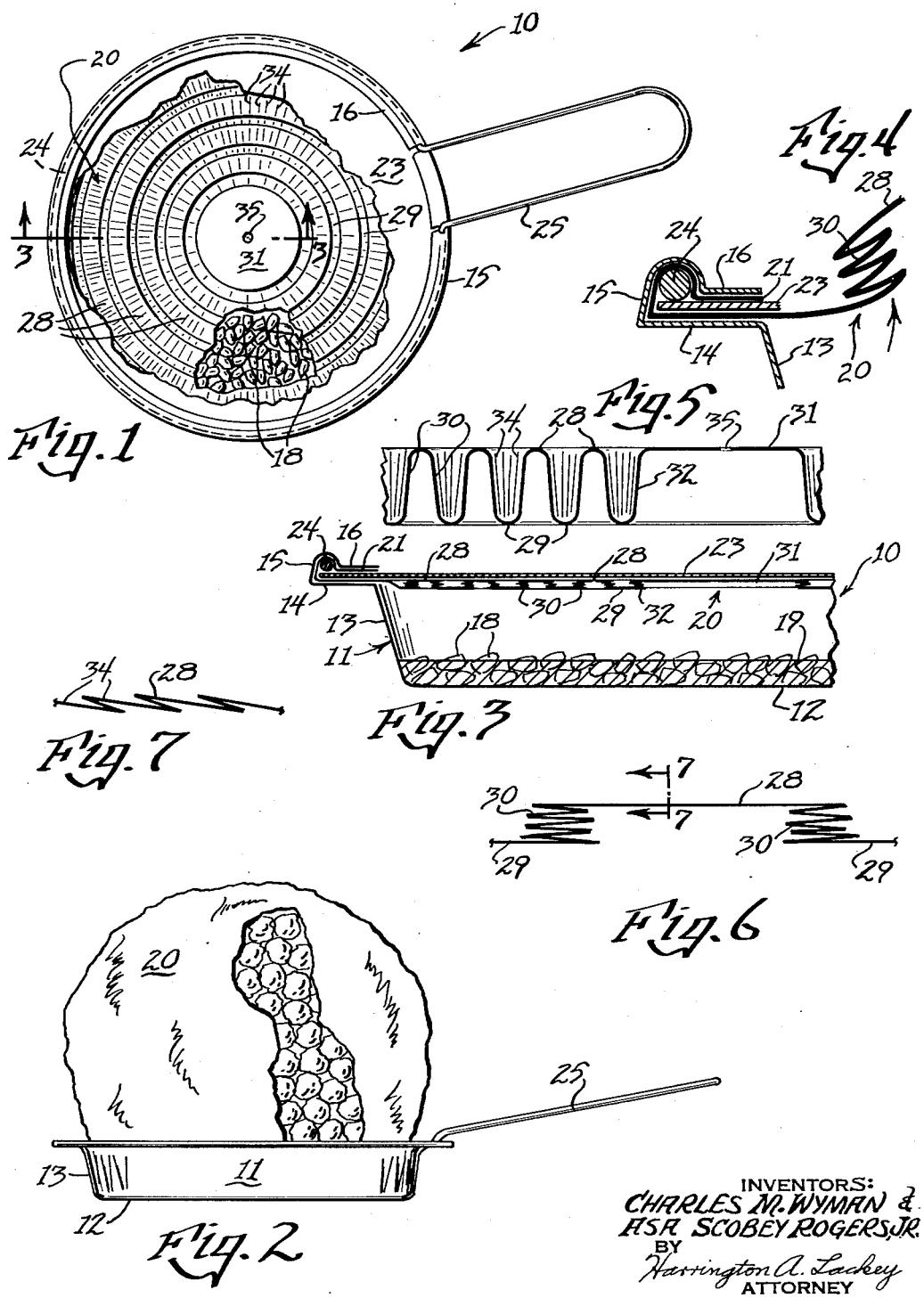
INVENTORS:
CHARLES M. WYMAN &
ASA SCOBEY ROGERS, JR.
BY
Harrington A. Lackey
ATTORNEY

United States Patent Office 3,140,034
Patented July 7, 1964

1

3,140,034
EXPANSIBLE COVER FOR A POPCORN PACKAGE
Charles M. Wyman and Asa Scobey Rogers, Jr., both of Nashville, Tenn., assignors to Blevins Popcorn Company, Nashville, Tenn., a corporation of Tennessee
Filed Oct. 13, 1961, Ser. No. 144,963
4 Claims. (Cl. 229—3.5)

This invention relates to a food container, and more particularly to a popcorn container having an expansible cover.

Although various types of packages have been developed having expansible covers for shipping, storing and cooking popcorn, it is an object of this invention to provide an improved expansible cover of novel construction for a container for food, and particularly popcorn.

One object of this invention is to provide an expansible cover for a food container, which is rigidly reinforced in its normal operative position closing the top of the container, and which may be readily expanded by internal pressure within the container.

Another object of this invention is to provide an expansible cover of thin, deformable sheet material for the top of a food container in which the structure of the cover comprises a plurality of concentric annular ridges and depressions.

Another object of this invention is to provide a novel cover for a food container in which the cover is made from expansible and deformable sheet material, such as a metallic foil, comprising annular ridges and depressions connected by folded side walls.

Another object of this invention is to provide a popcorn package having a heat-conductive pan and a novel expansible cover including a plurality of concentric annular pockets opening into the pan in order to facilitate the expansion of the cover from the internal pressure of the expanding gases.

A further object of this invention is to provide a method of making expansible cover for a food container by forming annular ridges and depressions in flat deformable sheet material and subsequently crushing the ridges and depressions toward each other to form connecting folded side walls.

A further object of this invention is to provide an expansible cover of sheet material in which the excess portions of the sheet material required for the expanded cover are folded systematically and flattened into a minimum space to provide optimum rigidity and strength for the cover in inoperative position, and adapted to be readily expanded upon application of pressure to the inner surfaces of the cover.

Further objects and advantages of the invention will be apparent from the following description taken in conjunction with the drawings wherein:

FIG. 1 is a top plan view of the invention with portions of the lid and cover broken away;

FIG. 2 is a side elevation of the invention with the lid completely removed and the expanded cover partially broken away;

FIG. 3 is a section taken along the line 3—3 of FIG. 1;

FIG. 4 is an enlarged fragmentary sectional elevation showing the peripheral portion of the partially expanded cover connected to the pan;

FIG. 5 is a sectional elevation of a portion of the cover showing the annular ridges and depressions before they have been flattened;

FIG. 6 is an enlarged sectional elevation of a flattened ridge and folded side walls in the cover;

FIG. 7 is a section taken along the line 7—7 of FIG. 6.

Referring now more particularly to the drawings in detail, this invention is preferably disclosed in the form of a popcorn package 10 including a receptacle, such as a

2 pan 11 made of heat-conductive material, such as aluminum. The pan 11 has a bottom wall 12, outwardly sloping side walls 13, and an open top. The upper peripheral edges of the side walls 13 extend laterally to form a bottom flange 14, an upstanding flange 15, and an inwardly extending top flange 16.

Disposed on the bottom of the pan 12 are the desired quantity of popcorn kernels 18 immersed in the cooking oil 19.

The cover or hood 20 for closing the top of the pan 10 is made of a sheet material much thinner than the thickness of the pan 10, and is deformable so that the sheet material may be molded into the desired shape embodying the novel construction. The sheet material is preferably metallic foil, such as aluminum, and is provided in sufficient quantity that the cover 20 may be expanded into the shape disclosed in FIG. 2 in order to increase the volume of the package 10 to many times the volume of the pan 11. The peripheral edges 21 of the cover 20 extend against the inner surfaces of the flanges 14, 15 and 16, so that the cover 20 may be securely sealed to the pan 10, as best disclosed in FIGS. 3 and 4. The remaining portion of the cover 20 is adapted to extend substantially flat across the open top of the pan 10 and rigidly support itself in that position, when the package is being shipped or stored and before the popcorn is cooked. In actual practice, the cover 20 has been made of aluminum foil approximately 0.00035 inch thick, while the pan 11 has been made of sheet aluminum about 0.0035 inch thick, or approximately ten times the thickness of the cover 20.

In order to protect the cover 20 and also to provide means for displaying advertising material, a circular paperboard lid 23 is placed on top of the cover 20. The peripheral edges of the lid 23 are contained and held between the peripheral edges of the cover 21 which are turned back upon themselves and around the supporting ring 24 for the wire handle 25. The heavier gauge metallic flanges 14, 15 and 16 are bent to contain the peripheral portions 21 of the cover 20, the paperboard lid 23 and the wire handle 24 in a rigid and secure position.

The novel improvement in the popcorn package resides in the construction of the cover 20, which is shaped from a piece of deformable sheet material, such as aluminum foil, of a size sufficient to multiply the volume of the package about three to six times its original size. Basically, the cover 20 comprises a plurality of concentric annular alternating ridges 28 and depressions 29 forming radially spaced curved or rounded channels. Each adjacent ridge 28 and depression 29 are connected by a folded side wall 30 which has been collapsed or crushed by flattening or pressing the ridges and depressions toward each other. The center portion 31 of the cover 20 is, in effect, an enlarged ridge comprising a circular flat top wall having depending peripheral folded side walls 32 connecting the center portion 31 to the adjacent annular depression 29.

In addition to the above features of the cover 20, the sheet material in each annular ridge 28 comprises circumferentially spaced pleats 34 to produce a telescoping effect. Thus, the internal pressure, created by the expanding gases from the cooking oil and popcorn, will unfold the pleats 34 to circumferentially expand or telescope each annular ridge 28. Since each depression 29 is nothing more than an inverted ridge, and an annular connecting portion between adjacent ridges 28, the depression 29 also comprises similar pleats 34.

It is thus apparent that the structural features, consisting of the concentric pleated annular ridges 28 and depressions 29 connected by the crushed folded side walls 30, produce a cover 20 which, in its initial, inoperative position covering the open top of the pan 10, as disclosed in FIG. 3, is not only well reinforced for maximum strength, but also provides an orderly arrangement in a minimum of space of the excess sheet material necessary for rapid expansion. It will be observed from FIG. 3, that the center portion 31 and the ridges 28 are substantially flat and lie in substantially the same plane across the open top of and parallel to the bottom wall 12 of the pan 11. Also, all the annular depressions 29 lie in another substantially flat plane proximate to and parallel to the plane of the center portion 31 and the ridges 28.

The method of making the cover 20 basically comprises two steps, first forming the ridges and depressions in an oversized piece of the desired sheet material, and secondly flattening or compressing the ridges and depressions toward each other to crush and fold the side walls connecting the ridges and the depressions. The formation of the ridges 28 and the depressions 29 may be accomplished in several ways, such as by shaping the sheet material between interdigitating annular dies. After comparatively deep ridges and depressions have been formed in the sheet material, as disclosed in FIG. 5, the ridges 28 and depressions 29 are then compressed toward each other, so that the side walls 30 will collapse into a plurality of folds within a confined area as disclosed in FIGS. 3 and 6. Such controlled formation of the crushed side walls 30 may be effected by compressing the ridges 28 and the depressions 29 as their respective dies are being withdrawn so that the side walls 30 will not be collapsed laterally and indiscriminately.

The operation of the invention is as follows:

After the cover 20 has been formed to include its flattened ridges and depressions, the popcorn 18 and oil 19, preferably in solid form, is deposited on the pan bottom 12. The cover 20 is then placed substantially flat across the open top of the pan 11. The peripheral edges of the foil 21 are adapted to lie upon the peripheral flanges 14 and 15 and 16 of the pan 10, which at this stage extend outwardly from the side wall 13. The lid 23 is then placed on top of the cover 20, the supporting ring 24 of the handle 25 is then placed on top of the periphery of the lid 23. With the above component parts in position, the flange portions 15 and 16 together with the peripheral foil edges 21 are then bent upwardly and inwardly over the supporting ring 24 and down upon the top of the lid 23 to completely secure all the component parts in position and to completely enclose the popcorn kernels 18 and the cooking oil or fat 19 within the package. Assembled in this manner, the package 10 will occupy a minimum of space in shipping or storage.

When it is desired to cook the popcorn 18, the lid 23 is removed and the entire package 10 is placed on top of the hot eye of a stove and manipulated by the handle 25. As the cooking oil 19 becomes heated, gases are generated, which in conjunction with the heated air within the pan 10, will expand and increase the upward pressure against the lower surfaces of the cover 20. These expanding gases will penetrate the annular pockets provided by the lower surfaces of the ridges 28 and against the bottom surfaces of the central portion 31 to unfold the side walls 30 and 32 and thereby force the ridges 28 to separate from the depressions 29. Additional heating of the pan 10 will cause the popcorn to evert or pop, thus creating additional pressure against the bottom surface of the cover 20 and further causing the ridges 28 to separate from the depressions 29 by unfolding and expanding the side walls 30. As the cover 20 expands and rises under the bombardment of the everted popcorn kernels and expanding gases, each of the annular ridges and depressions will also expand circumferentially because of the unfolding pleats 34 in each of the ridges 28 and depressions 29. After all of the popcorn has popped, the cover 20 will be inflated substantially so that no creases or folds will exist, and the ridges 28 and depressions 29 and the side walls 30 will have merged into one continuously smooth surface, as disclosed in FIG. 75

2. The package 10 is then removed from the heat, the foil or sheet material cut open and the popcorn is ready to eat. Thus, the package not only serves as a shipping and storing container for the popcorn 18 and oil 19, but also serves as a cooking utensil and a serving pan.

If desired, a small pin hole may be formed through the cover 20, such as the hole 35 formed through the central portion 31 as illustrated in FIG. 1. This hole provides a vent for excessive pressure, without materially reducing the pressure necessary to expand the cover 20.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. An expansible cover for a receptacle comprising:
   (a) a planar sheet of pliable metal foil having a center,
   (b) a plurality of radially spaced apart curved channels in said sheet extending continuously around said center,
   (c) each channel comprising side and bottom walls displaced from the plane of said sheet,
   (d) circumferentially spaced radial pleats in said channel walls and in the portions of said sheet between said channels,
   (e) said channels and pleats accumulating said foil to permit expansion of said sheet in a direction normal to the plane of and circumferentially of said sheet upon the application of forces to said sheet.

2. An expansible cover for a receptacle comprising:
   (a) a planar sheet of pliable metal foil having a center,
   (b) a plurality of radially spaced apart circular concentric channels in said sheet,
   (c) each channel comprising side and bottom walls displaced from the plane of said sheet,
   (d) circumferentially spaced radial pleats in said channel walls and in the portions of said sheet between said channels,
   (e) said channels and pleats accumulating said foil to permit expansion of said sheet in a direction normal to the plane of and circumferentially of said sheet upon the application of forces to said sheet.

3. An expansible cover for a receptacle comprising:
   (a) a planar sheet of pliable metal foil having a center,
   (b) a plurality of radially spaced apart curved channels in said sheet extending continuously around said center,
   (c) each channel comprising side and bottom walls displaced from the plane of said sheet,
   (d) circumferentially spaced radial pleats in said channel walls and in the portions of said sheet between said channels,
   (e) said channel side walls being collapsed to space said bottom walls proximate to the plane of said sheet,
   (f) said channels and pleats accumulating said foil to permit expansion of said sheet in a direction normal to the plane of and circumferentially of said sheet upon the application of forces substantially normal to the plane of said sheet.

4. The invention according to claim 3 in which said channels are concentrically circular.

References Cited in the file of this patent

UNITED STATES PATENTS

| | | |
|---|---|---|
| 1,913,652 | Alexander | June 13, 1933 |
| 2,574,710 | Rogers | Nov. 13, 1951 |
| 2,673,805 | Colman | Mar. 30, 1954 |
| 2,673,806 | Colman | Mar. 30, 1954 |
| 2,728,479 | Wheeler | Dec. 27, 1955 |
| 2,815,883 | Robins et al. | Dec. 30, 1957 |